United States Patent [19]

Braissant et al.

[11] 4,426,671

[45] Jan. 17, 1984

[54] PROCESS AND APPARATUS FOR THE SHORT-CIRCUIT PROTECTION OF A.C. CIRCUITS

[75] Inventors: Pierre Braissant, Vevey; Ivan De Mesmaeker, Windisch, both of Switzerland

[73] Assignee: BBC Brown, Boveri & Co., Ltd., Baden, Switzerland

[21] Appl. No.: 414,933

[22] Filed: Sep. 3, 1982

Related U.S. Application Data

[63] Continuation-in-part of Ser. No. 151,809, May 21, 1980, abandoned.

[30] Foreign Application Priority Data

Jul. 2, 1979 [CH] Switzerland .................. 6177/79

[51] Int. Cl.³ .................................. H02H 3/18
[52] U.S. Cl. ............................ 361/82; 361/80; 361/85; 361/111
[58] Field of Search .................... 361/62–66, 361/85, 110, 111, 80, 82

[56] References Cited

U.S. PATENT DOCUMENTS 2,147,842  2/1939  Hunt ............................... 361/85 X
4,222,085  9/1980  De Mesmaeker .................. 361/80
4,237,511 12/1980  De Mesmaeker .............. 361/82 X Primary Examiner—Reinhard J. Eisenzopf
Attorney, Agent, or Firm—Oblon, Fisher, Spivak, McClelland & Maier

[57] ABSTRACT

A process and device useful in the protection of AC current circuits, particularly of parallel lines supplied at both ends, provided with protection relays at both ends of the line against susceptibility to false triggering as a result of transient signal components and signals disturbances, and particularly useful in providing stepped protection upon initial disconnection at one side of a line after occurrence of a short circuit against the change of energy direction with reversal of the fault direction detected in the protection relay of the sound line on crossing the triggering range of the appropriate characteristics curve, which also leads to false triggerings in multi-system protection relays because of transient switching inaccuracies. On the transition of a protection relay from the blocked to the triggering condition, the process and device maintains the blocking condition for a limited time interval of at least a half period for the phase angle measuring systems with coincidence and anticoincidence signals (k and ak respectively) by means of an interlocking circuit connected to an anticoincidence channel of one measuring system and released for triggering after a predetermined time.

6 Claims, 5 Drawing Figures

PROCESS AND APPARATUS FOR THE SHORT-CIRCUIT PROTECTION OF A.C. CIRCUITS

BACKGROUND OF THE INVENTION

This is a continuation-in-part application of Ser. No. 151,809 filed May 21, 1980, now abandoned.

FIELD OF THE INVENTION

This invention relates to a process for the short-circuit protection of A.C. current circuits, particularly circuits having at least two parallel lines, as well as a device for carrying out such a process.

DESCRIPTION OF THE PRIOR ART

Such a protection device and the associated service operation are known from "Brown Boveri Review" 1966, No. 11/12, p. 786. With such a distance protection device working with a phase-comparison measuring system, current and voltage transients should as far as possible, not enter into the measuring accuracy, i.e. into the position of the actual limits of the response or protection zone. The requirements are very strict in this respect, especially for a protection relay with a polygonal characteristic curve in the impedance plane, because, in contrast to circular characteristic curves, even small angular errors—in particular a rotation of the reactance limit of the triggering range—cause a relatively large displacement of the intersecting point of the characteristic curve with the power line, i.e. the response limit. Furthermore, for protection relays with several measuring systems, e.g. polygon-relays with, besides a resistance component, a measuring system (reactance component) to determine the reactance limit and a measuring system (direction component) to determine the direction of the defect with respect to the measuring point in intermeshed networks, in particular for double supply of parallel lines with a protection relay at both ends of each line, the problem of the so-called "system race" occurs if, corresponding to the mode of action of the stepped protection, a short-circuit is disconnected on one line at one end of the circuit and afterwards with a certain delay at the other end or disappears after the one-sided disconnection. In the parallel circuits the energy direction is then reversed after the first one-sided disconnection, so that the working points in the measuring system of the protection relays on both sides change on crossing the triggering range. The measuring systems of a relay thereby change opposed to one another from the blocking condition to the triggering condition, so that a delay arising because of transient spurious signals or the like can cause the simultaneous occurrence of the triggering condition in both systems and therefore, because of the conjunctive coupling of the systems in the sense of the total triggering characteristic curve, a faulty triggering on a healthy circuit.

SUMMARY OF THE INVENTION

Accordingly, the objects of this invention are to provide a novel process and device for circuit protection, characterized by an insensitivity against transient disturbances with respect to faulty triggerings.

These and other objects are achieved according to the invention by providing a new and improved process for the protection of alternating current circuits against short circuits, particularly of at least two parallel lines supplied at both ends with a protection relay at each end, in which each protection relay is maintained on the output side in the blocking position for at least one half-period on the transition from a blocking condition to a triggering condition.

According to the invention, the maintenance of the blocking condition, upon occurrence of the transition to the triggering condition, not adversely affecting the protection function for a limited time interval, prevents with a high degree of security the coincidence of uncorrelated relay conditions on opposing changes of condition of the relay systems, and also increases generally the safety function against transient signal components or signal disturbances.

According to the invention, there is provided a new and improved device for implementing the above-noted process which utilizes in particular the presence or the easy deductibility of complementary coincidence and anticoincidence signals which are known to represent a measure for the phase angle based on the time duration of these signals between a measured quantity on one supply line, e.g. the conventional voltage difference between the line voltage $U_k$ and reference voltage level $U_R$, and a reference quantity, e.g. the reference voltage level $U_R$, namely the anticoindence signal for the phase angle p itself and the coincidence signal for its complement pk. The coincidence signal is the output signal of an AND-gate like that which is part of the known prior art phase measuring device described above. The inverse character of these signals makes possible a corresponding complementary use in the triggering or blocking sense. A locking mechanism depending on the anticoincidence signal thus allows an advantageous simple priority blocking, whereby the use of locking circuits allows equally easily a defined time duration of the order or a half period or more for the priority blocking.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
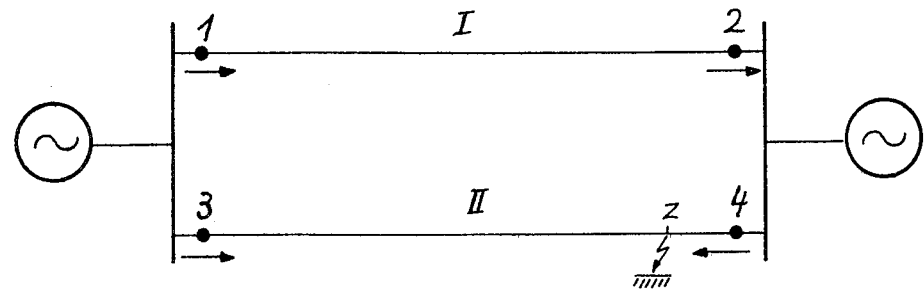
FIG. 1 is a schematic circuit diagram of a double line supplied at both ends with a short-circuit on one line.
Figure 2:
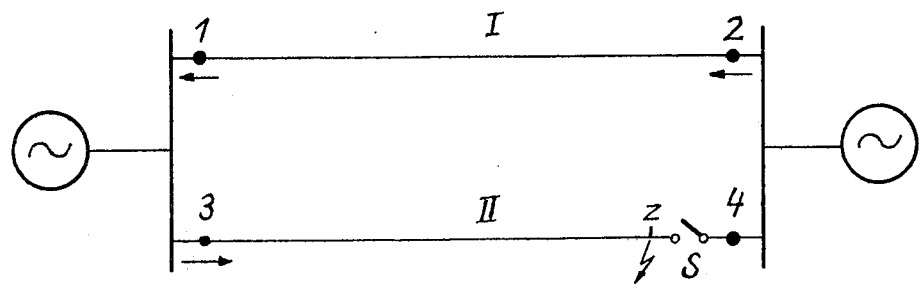
FIG. 2 is a schematic circuit diagram of the double line as in FIG. 1, after disconnection of the shorted line on one side thereof.

Referring now to the drawings, wherein like reference numerals designate identical or corresponding parts throughout the several views, and more particularly to FIGS. 1 and 2 thereof, there is shown a double line I, II between two supplied bus bars, whereby a short circuit is assumed at Z on line II. The directions of energy flow corresponding to the short circuit current generated from both sources via the branches of the circuit, i.e. the fault directions detected at the protection relays 1 to 4 and the ends of the power lines, are indicated by the arrows marked. On interrupting the line at the circuit breaker S connected to the relay 4, the line is disconnected at one side after a fault occurs. The changes in the fault directions detected at the individual relays, apparent from a comparison of FIGS. 1 and 2, thus result.

Figure 3:
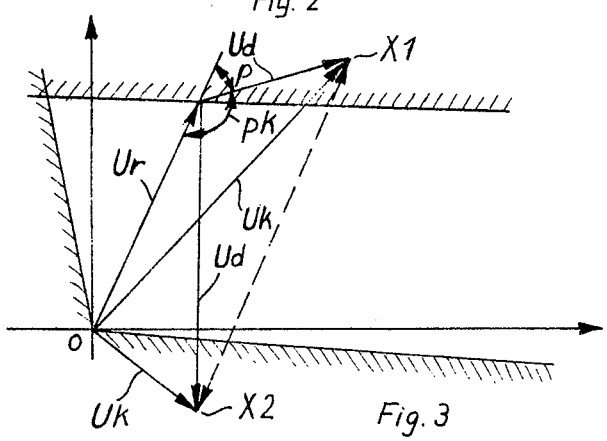
FIG. 3 is a polygonal phasor diagram with working points on both sides of the triggering range corresponding to a condition before and after the disconnection on one side of the shorted line.

In the triggering diagram of FIG. 3 illustrating polygonal characteristic curves, there occurs e.g. an opposing transition between the operating points X1 and X2 for the relays 1 and 2 of the healthy line on crossing through the triggering range. The vectors of a reference voltage Ur and the line voltage $U_k$ and the conventional range difference Ud resulting therefrom are schematically indicated for the operating points.

Figure 4:
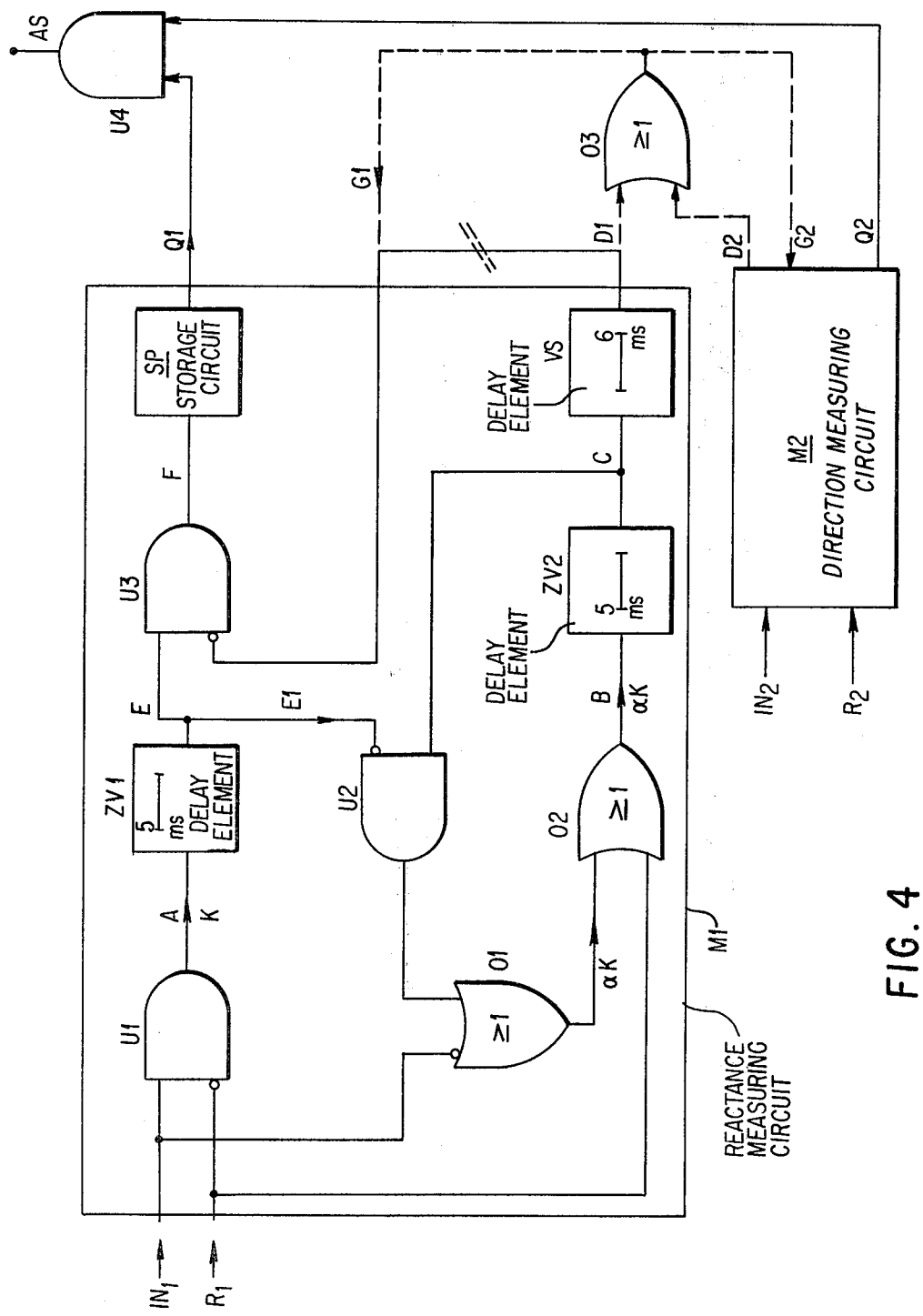
FIG. 4 is a block diagram of a transition interlocking mechanism according to the invention of a two system protection relay.

The circuit M1 as well as the identically composed circuit M2 of FIG. 4 comprises a coincidence channel with the representative point A and an anticoincidence channel B with the corresponding point B. A coincidence signal k is supplied to the input In and can be blocked by an AND-gate U1 by means of a releasing signal at the input R. The anticoincidence signal ak, which can be superimposed in an OR-gate on the releasing signal from R, is formed from the coincidence signal k via an OR-gate O1 with inverting input. The releasing signal R is only used to define a specific initial logic state of the logic units in circuit M1, for example, all times the protection relay is started, and can be obtained manually or by an overall control unit. The signals k and ak are fed to time limit switches ZV1 and ZV2 respectively, which detect the phase angle between Ur and Ud going above or below the limiting values of 90° and 5 ms (for 50 Hz mains frequency) in the sense of an engaging or release of the operating point in the triggering range. An affirmative binary signal at point E thus means releasing blocking at point C. In the starting condition before the occurrence of a fault, C is a "1", E is "0". In this condition the anticoincidence channel maintains itself via a holding current with a blocking AND-gate U2, until the first triggering command of "1" arrives at E and the locking circuit interrupts across the blocking input E1 or U2. The blocking of the A-channel however is, as a consequence of a 6 ms switching delay VS, maintained with "1" at the point D1 across a blocking AND-gate U3 for at least a further time period of 6 ms from the excitation with the initial exceeding of the 90° or 5 ms coincidence intervals, i.e. in total for at least a half period, so that the described transition phenomena with a possible simultaneous triggering of two measuring systems, particularly the measuring system to determine the reactance limit of which the circuit M1 is a part of, for example, and the measuring system to determine the direction of the fault, of which identically composed M2 is a part of, is certainly avoided. The circuits M1, M2 are therefore modifications of the aforementioned prior art "Integrator In" and "Trigger Tr" outputs for each of a direction and a reactance component measuring system. After a delay in the locking circuit, U3 subsequently releases the triggering with "1" at point F and across a conventional storage circuit SP to the AND-gate U4 for the super-position of the characteristic curves of the measuring systems M1 and M2 to the output AS.

It is also advantageous to provide a common mutual interlocking of both circuits M1 and M2, by means of the circuit connection indicated with a dotted line with anticoincidence-blocking output D2 from M2 and coupled OR-gate O3. Blocking inputs G1 and G2 lead in both systems to blocking AND-gates corresponding to U3 in M1. The triggering outputs Q1 and Q2 of the system are then already blocked for the transition period depending on the anticoincidence blocking signal in only one system, i.e. with high breakdown safety.

Figure 5:
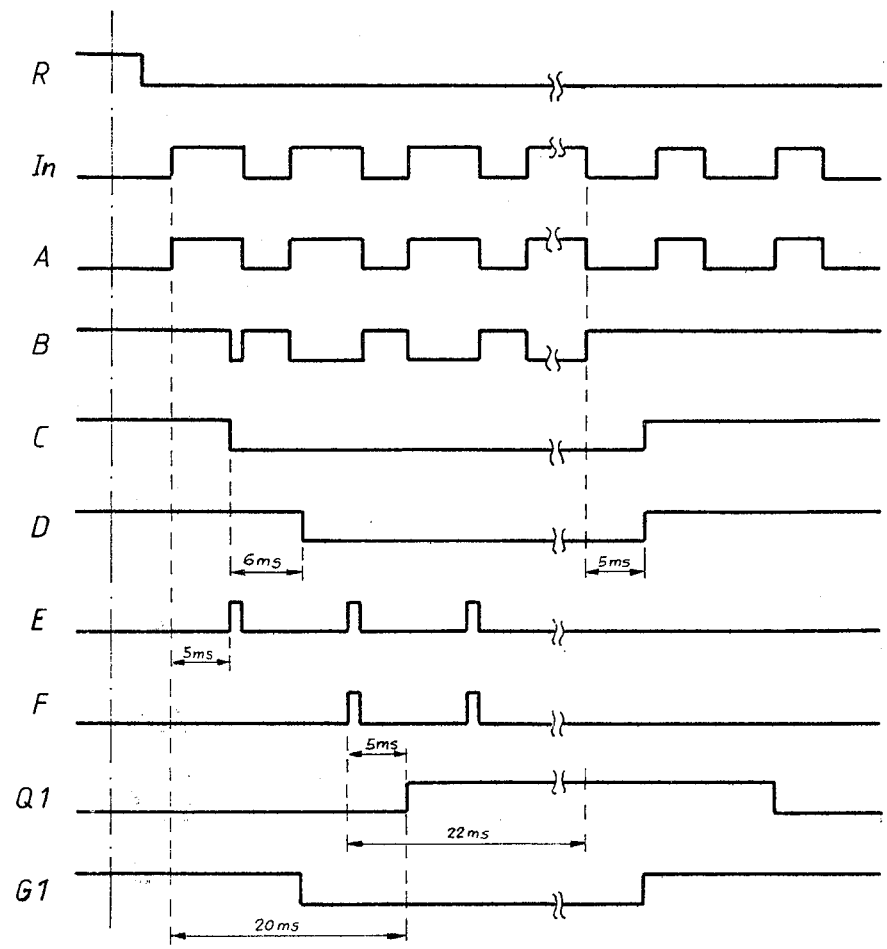
FIG. 5 is a timing diagram illustrative of the operation of the circuit of FIG. 4.

The signal curves at the various switching points described in FIG. 4 are shown in FIG. 5 and can be understood without further discussion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the protection against short circuits of alternating current circuits formed of at least two lines, each of which is supplied at both ends thereof with a protection relay, which has an output side and which relay can be in a blocking position on the output side, comprising:
    maintaining each protection relay on the output side in the blocking position for at least one-half period of the main frequency of the alternating circuit on the transition from a blocking condition to a triggering condition.

2. A device for the protection against short circuits of alternating current circuits formed of at least two lines, each of which is supplied at both ends thereof with a protection relay, comprising:
    at least one protection relay having at least one coincidence and anticoincidence phase-angle measuring system for a comparison of critical values of the phase angle between a measured quantity on one line and a reference quantity,
    said measuring system comprising signal channels (A, B) for a binary coincidence signal (k) and a binary anticoincidence signal (ak) corresponding to the phase angle complement (pk) and the phase angle (p), respectively, between the measured quantity on said one line ($U_d$) and the reference quantity ($U_r$),
    a time interval interlocking circuit (U2, U3) coupling the signal channels (A, B) to each other,
    wherein the anticoincidence channel (B) comprises a blocking control connection with an output (Q1) of the at least one measuring system via said interlocking circuit active for a limited time interval.

3. A device according to claim 2, in which the interlocking circuit comprises:
    a self-maintaining circuit (C, U2, O1) looped into the anticoincidence channel (B) with a triggering input (E1) connected to the coincidence channel (A).

4. A device according to claim 3, in which the self-maintaining circuit comprises:
    an AND-gate (U2) having one input connected to an output (C) of an anticoincidence-limiting value switch (ZV2), another input connected as a blocking input to the output (E) of a conicidence-limiting value switch (ZV1) and an output connected to an input of an OR-gate (O1) to the input side of the anticoincidence channel (B).

5. A device according to claims 2, 3 or 4, in which the protection relay comprises:

two measuring circuits (M1, M2) arranged as a reactance measuring circuit (M1) and a direction measuring circuit (M2) as sub-systems of a protection relay with polygonal triggering characteristic curves, wherein the time interval interlocking circuits of both measuring circuits (M1, M2) are at any given time alternately connected to an output, active in the blocking sense, of the anticoincidence channel of the other measuring circuit.

6. A device according to claim 5, in which the time interval interlocking circuits of both measuring circuits (M1, M2) are in blocking control connection via an OR-gate (O3) with the anticoincidence channels of both measuring circuits.

* * * * *